July 6, 1943.  E. R. BARRETT  2,323,366
REFUSE PACKER
Filed Dec. 26, 1940  2 Sheets-Sheet 1

INVENTOR
Edward R. Barrett.
BY
Harness, Dickey & Pierce.
ATTORNEYS.

July 6, 1943.          E. R. BARRETT          2,323,366
REFUSE PACKER
Filed Dec. 26, 1940          2 Sheets-Sheet 2
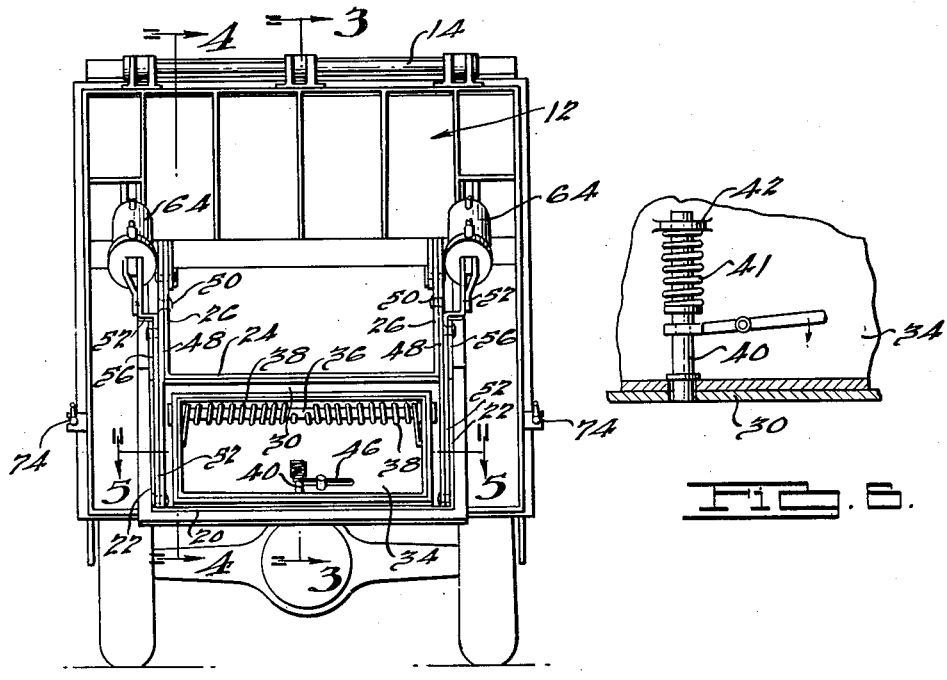
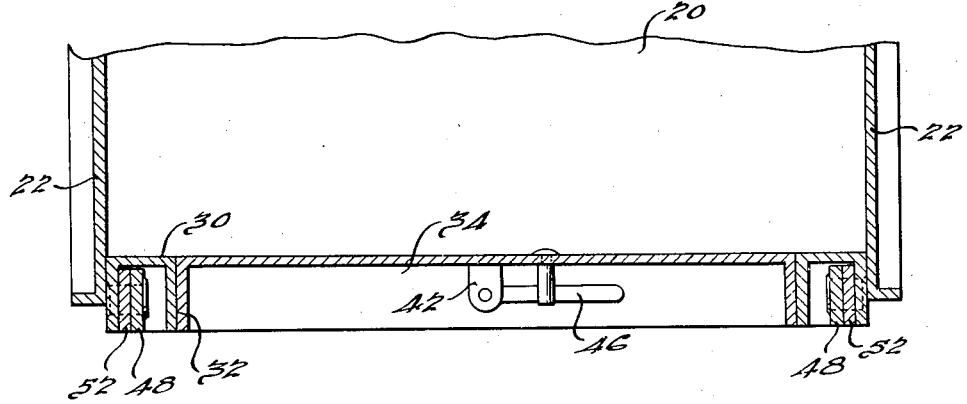
INVENTOR
Edward R. Barrett
BY
Harness, Dickey & Pierce
ATTORNEYS Patented July 6, 1943

2,323,366

UNITED STATES PATENT OFFICE 2,323,366

REFUSE PACKER

Edward R. Barrett, Detroit, Mich., assignor to Gar Wood Industries, Inc., Detroit, Mich., a corporation of Michigan Application December 26, 1940, Serial No. 371,732

17 Claims. (Cl. 214—67)

The present invention relates to improvements in material handling devices and particularly relates to improvements in refuse trucks, such as that disclosed and claimed in the United States Patent No. 2,212,058 of George B. Wood, patented August 20, 1940.

One of the primary objects of the present invention is to provide an improved material handling device in which the material is packed into a receptacle under pressure in an improved manner.

A further object of the invention is to provide an improved inlet chute or conduit which is so constructed and arranged with respect to the receptacle body that the refuse, or like material, is retained in the receptacle after the combined closure gate and packing ram has been returned to its initial position.

A further object of the invention is to provide an improved and simplified material injection conduit for packing the material into a receptacle in which one of the walls of the conduit is movable to act as a material packing and retaining member.

A further object of the invention is to provide an improved packing means whereby the inlet conduit is kept free of material, except during loading, in that material which has been previously packed into the receptacle body is retained therein and kept from returning to the inlet conduit.

A further object of the invention is to provide an improved inlet conduit in which one of the walls thereof is movable so that normally the inlet conduit is of smaller cross-sectional area adjacent the outlet end thereof than at the inlet end thereof, so that when the material is passed through the conduit the cross-sectional area enlarges to permit the free passage of material therethrough, but the movable wall thereafter returns to its normal, initial position so that the cross-sectional area is smaller adjacent the outlet end to prevent the return of material into the conduit through the outlet end.

Other objects of the invention will become apparent from the following specification, the drawings relating thereto and from the claims hereinafter set forth.

In the drawings, in which like numerals are used to designate like parts in the several views throughout:

Fig. 2 is a rear elevational view of the structure shown in Fig. 1;

Fig. 5 is a cross-sectional view taken substantially along the line 5—5 of Fig. 2; and Fig. 6 is an enlarged cross-sectional view, with parts in elevation, taken substantially along the line 6—6 of Fig. 3.

In handling bulky materials, such as refuse, it will be appreciated that one of the main considerations is to increase the load capacity of the refuse truck bodies and at the same time provide for ease and speed in loading. Such vehicles are moved from station to station, requiring numerous stops and requiring the loading of relatively small amounts at each station. It is, therefore, highly important that the speed of loading at each of such stations be increased as much as possible.

According to the present invention, the material being loaded is dropped into an inlet chute mounted on one of the walls of the receptacle, which is provided by the vehicle body, and such material is thereafter rammed into the receptacle under pressure so that it is tightly packed therein. After the material is packed into the receptacle, it is retained therein and kept from falling back into the inlet conduit so that such conduit is empty for the successive loadings. This saves considerable time, since it is not necessary to clear the inlet conduit or chute before the materials are dumped therein by the operator.

Figure 1:
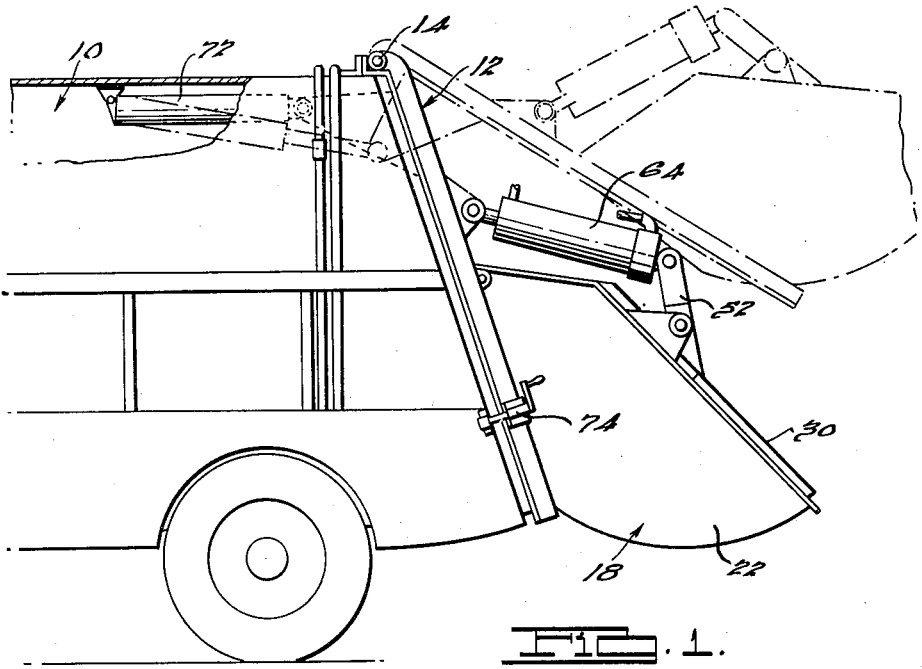
Figure 1 is a partial, side elevational view of a refuse truck body embodying features of the present invention.

Referring to the drawings, the rear end of a truck body is generally indicated at 10, it being understood that such body is part of a truck having the driving means disposed adjacent the forward end thereof in the usual way. The truck body is of the type disclosed in the above mentioned Wood patent, and is provided with a unitary rear door closure generally indicated at 12. Such rear door closure is pivotally mounted along the upper end by pivots 14, which may be carried by suitable brackets attached to the top rear end of the truck body 10. It will be appreciated that the entire rear closure 12 may be swung open to the position shown in broken lines in Fig. 1, so that the body 10 may be tilted for dumping.

The closure door 12 is provided with a generally rectangular opening 16 therethrough which communicates with the interior of the body. An inlet chute or conduit is mounted on the rear closure 12, for movement therewith, overlying the opening 16, and provides a means for introducing and packing the bulky refuse material into the receptacle provided by the body 10. Such inlet chute or conduit is generally indicated at 18 and comprises a bottom wall member 20, side wall members 22 and a top wall member 24. The conduit defined by such wall members has an outlet end adjacent the opening 16 and has an inlet end adjacent the opposite end thereof.

Figures 3, 4:
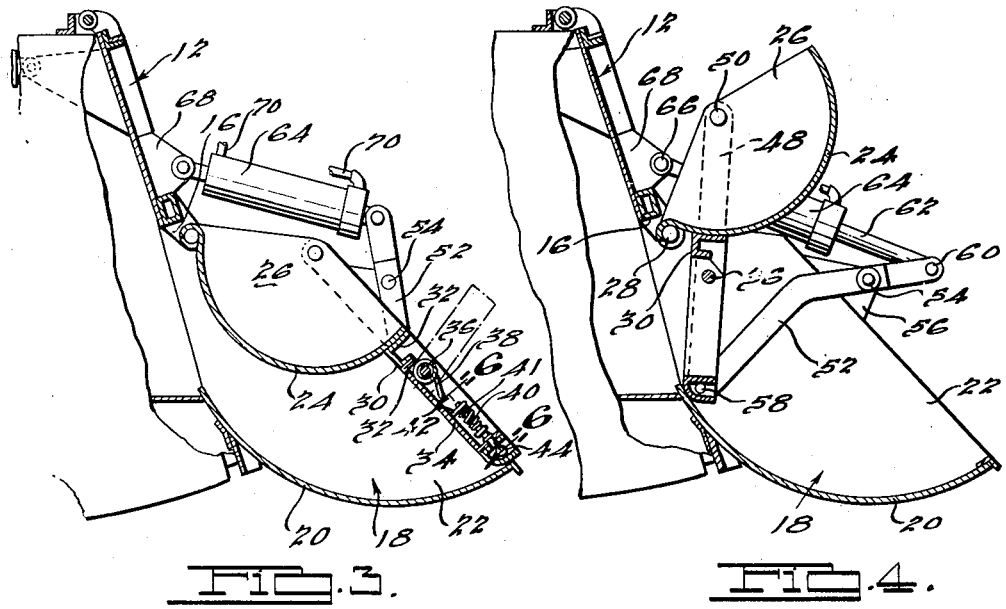
Fig. 3 is a cross-sectional view taken substantially along the line 3—3 of Fig. 2.
Fig. 4 is a cross-sectional view taken substantially along the line 4—4 of Fig. 2 and showing the movable conduit wall and the closure ram in different positions than those shown in Fig. 3.

The top wall member 24 is downwardly and outwardly curved and has upstanding side walls 26 which are disposed between the side wall members 22 and may slidably bear thereagainst. The top wall member 24 is downwardly and outwardly curved and is pivotally mounted with respect to the bottom and side wall members and also with respect to the conduit outlet, by means of pivots 28 disposed adjacent the outlet end of the conduit and adjacent the opening 16. The bottom member 20 is complementarily curved so that the passageway defined by the conduit members is normally of smaller cross-sectional area adjacent the outlet end thereof, as shown in Fig. 3, than at the inlet end thereof.

A combined closure and loading ram member 30 is disposed within the conduit and has its upper edge 32 curved to bear against the bottom of top closure member 34, and has its bottom edge adapted to slidably bear against the bottom member 20. The sides of such ram 30 bear against the side wall members 22. Such member 30 is provided with an inlet opening 32 therethrough within which a door 34 is disposed. Such door 34 is pivotally mounted with respect to the opening 32 on a pivot shaft 36, which may be fixed to the sides of member 30. A spring 38 is disposed about the pivot shaft 36 and has its inner ends fixed with the opposite ends bearing against the door 34, so that such door is normally urged to its closed position.

The door may be latched in its closed position by means of a latch pin 40 slidably mounted within brackets 42 and normally urged to its latching position by spring 41, wherein it projects through aligned openings 44 formed in adjacent faces of the door member 34 and the frame of the closure member 30. Such latch may be opened by means of a pivoted operating handle 46, so that the door 32 may be swung open to the position shown by broken lines in Fig. 3. When so swung open, it will be appreciated that the refuse may be dumped through the opening 32 into the inlet chute or conduit. The door 34 will thereafter be returned to its closed position and will be automatically latched shut by means of the spring 41.

The closure ram 30 is pivotally mounted upon upwardly projecting members 48, which are fixed to the sides thereof and which have their upper ends pivotally connected to the sides 26 of the top closure members by means of pivot pins 50. The members 48 are rigidly connected to the ram 30 so that the ram 30 and members 48 move together.

It will thus be seen that since the bottom of top member 24 bears against the top surface 32 of closure 30 and as the side walls 26 are connected to the member 30 through members 48, as the member 30 is moved from the inlet end of the conduit toward the outlet end thereof, the top member 24 is caused to move upwardly and pivot about its pivots 28 from the position shown in Fig. 3 to that shown in Fig. 4. The material which has been dumped into the inlet conduit through the door 34 is thus forced or rammed through the conduit and packed into the receptacle through the outlet of the conduit. The cross-sectional area of the conduit is increased as the ram moves toward the outlet end due to the pivoting of the top wall member 24.

As the ram 30 is returned to its initial position adjacent the inlet end of the conduit, it will be appreciated that the top closure member 24 is pulled downwardly to its initial position through members 48 so that it returns to the position shown in Fig. 3. It will be seen that the curved character of the top member 24 acts to exert a force downwardly and inwardly of the receptacle body so that the bulky material, which has been deposited therein, is engaged by the top wall 24 and is forced back into the receptacle and retained therein. Such material, due to its bulky character, will not refill the inlet conduit, so that such conduit will be empty and clear for the reception of the next deposit therein.

The means for forcing the closure ram 30 inwardly and outwardly and for pivoting the top wall 28 upwardly and downwardly comprises operating arms 52, which are pivotally mounted by pivot pins 54 on brackets 56 mounted on the sides 22 of the inlet chute. Each of such members 52 is mounted intermediate its ends by the pivots 54, and each has the lower end thereof pivotally connected to the lower end of closure member 30 by means of pivot pins 58. The upper ends of lever members 52 are pivotally connected by pivot pins 60 with piston rod 62 of a piston which is disposed within hydraulic cylinder 64. The inner end of each hydraulic cylinder is pivotally connected by a pivot pin 66 to bracket 68 mounted on the door 12. Suitable hydraulic conduits 70 are associated with the cylinder 64 in the usual way, and are connected to a suitable source of hydraulic power in the usual way for operating the pistons to move the closure ram 30, as indicated above.

Also, a suitable hydraulic jack, indicated at 72 and comprising a cylinder and piston provided with the usual hydraulic conduits, is mounted upon the body and connected to the door 12 for power opening of such door. The hydraulic connections and source of hydraulic pressure for the jacks described above are well known in the art. Also, suitable clamping means, such as those indicated at 74, may be provided on the body and door for releasably clamping the door 12 shut.

Formal changes may be made in the specific embodiment of the invention described without departing from the spirit and substance of the invention, the scope of which is commensurate with the appended claims.

What is claimed is:

1. A material handling device comprising a receptacle, an inlet conduit having an outlet formed in one end thereof in communication with the interior of said receptacle, an inlet formed in said conduit in the opposite end thereof, said conduit being defined by wall members, one of the wall members being inwardly curved adjacent the outlet end thereof, means movably mounting said one of the walls for movement with respect to said outlet and with respect to the other wall members, a movable closure member disposed within said conduit and movable within the conduit between the inlet and outlet ends thereof, means for moving said closure member toward said outlet to force said material through said conduit, and means for moving said movable wall member to retain said material in said receptacle when said closure member is returned to its initial position.

2. A material handling device comprising a receptacle, an inlet conduit having an outlet adjacent one end thereof in communication with the interior of said receptacle, an inlet formed in said conduit in the opposite end thereof, said conduit being defined by wall members, one of said wall members being inwardly curved adjacent the outlet thereof, means pivotally mounting said one of the wall members adjacent said outlet end so that said one of the wall members is movable with respect to the outlet, a movable closure member disposed within said conduit and movable between said inlet and outlet ends thereof, means for moving said closure member towards said outlet to force said material through said conduit into said receptacle, and means for moving said movable wall member to retain said material in said receptacle when said closure member is returned to its initial position.

3. A material handling device comprising a receptacle, an inlet conduit having an outlet adjacent one end thereof in communication with the interior of said receptacle, an inlet formed in said conduit in the opposite end thereof, said conduit being defined by longitudinal wall members, one of said longitudinal wall members being shaped so that said conduit is normally of smaller cross-sectional area adjacent the outlet end thereof than the inlet end thereof, means movably mounting said one of said wall members to enlarge the cross-sectional area adjacent the outlet end, a movable closure member disposed within said conduit and movable between the inlet and outlet ends thereof, means for moving said closure member towards said outlet to enlarge said cross-sectional area adjacent the outlet end and for moving said closure member towards said outlet to force said material through said conduit into said receptacle, and means for moving said movable wall member to retain said material in said receptacle when said closure member is returned to its initial position.

4. A material handling device comprising a receptacle, an inlet conduit having an outlet adjacent one end thereof in communication with the interior of said receptacle, an inlet formed in said conduit in the opposite end thereof, said conduit being defined by top, bottom, and side wall members, said top wall member being downwardly and outwardly curved adjacent the outlet thereof, means pivotally mounting said top wall member adjacent the outlet end thereof, a movable closure member disposed within said conduit and movable between said inlet and outlet ends thereof, means for moving said closure member towards said outlet for forcing said material through said conduit into said receptacle, and means for moving said top wall member about its pivot to retain said material in said receptacle when said closure member is returned to its initial position.

5. A material handling device comprising a receptacle, an inlet conduit having an outlet adjacent one end thereof in communication with the interior of said receptacle, an inlet formed in said conduit in the opposite end thereof, said conduit being defined by top, bottom and side wall members, said top wall member being downwardly and outwardly curved adjacent the outlet thereof, means pivotally mounting said top wall member adjacent the outlet end thereof, a movable closure member disposed within said conduit and movable between the inlet and outlet ends thereof, said closure member engaging the top, bottom and side wall members during its movement between the inlet and outlet ends thereof, means for moving said closure member towards said outlet to force said material through said conduit into said receptacle, and means for moving said movable wall member as said closure member is moved towards said outlet to permit the free passage of material through said conduit and for returning said top wall member to its initial position when said closure member is returned to its initial position to retain said material in said receptacle.

6. In a refuse truck, a body providing a refuse receptacle, a packing conduit mounted on one of the walls of said receptacle, said packing conduit having an outlet adjacent one end thereof in communication with the interior of said receptacle, an inlet formed in said conduit in the opposite end thereof, said conduit being defined by top, bottom and side wall members, one of said wall members being movable with respect to the other of said wall members, a movable closure member disposed within said conduit and movable between the inlet and outlet ends thereof, means for moving said closure member through said conduit to pack said material into said receptacle, means co-operable with said closure member and said movable wall member for moving said movable wall member to retain said packed material in said receptacle when said closure member is returned to its initial position, and means providing an inlet for depositing material with the conduit.

7. A material handling device comprising a receptacle, an inlet conduit having an outlet adjacent one end thereof in communication with the interior of said receptacle, an inlet formed in said conduit in the opposite end thereof, said conduit being defined by top, bottom and side wall members, said top and bottom wall members being complementarily shaped so that the cross-sectional area is normally smaller adjacent the outlet end than adjacent the inlet end thereof, means movably mounting said top wall member to vary the cross-sectional area of said conduit, a movable closure member disposed within said conduit and disposed between the inlet and outlet ends thereof, means for moving said closure member towards said outlet to force material through said conduit into said receptacle, and means for moving said top wall member to retain said material in said receptacle when said closure member is returned to its initial position.

8. A material handling device comprising a receptacle, an inlet conduit having an outlet adjacent one end thereof in communication with the interior of said receptacle, an inlet formed in said conduit in the opposite end thereof, said conduit being defined by top, bottom and side wall members, said top and bottom wall members being curved and complementarily shaped so that said conduit is normally of smaller cross-sectional area adjacent the outlet end thereof than the inlet end thereof, means pivotally mounting said top member adjacent the outlet end thereof for movement with respect to said outlet and with respect to said bottom wall member, a movable closure member disposed within said conduit end between the inlet and outlet ends thereof, means pivotally mounting said closure member on said top wall member, and means for moving said closure member towards said outlet to force material through said conduit into said receptacle and to pivot said top wall member upwardly and for moving said closure member towards said inlet to its initial position to pivot said top wall member downwardly towards said outlet to thereby retain said material in said receptacle when said closure member is returned to its initial position.

9. A material handling device comprising a receptacle, an inlet conduit having an outlet in communication with the interior of said receptacle, an inlet formed in said conduit in the opposite end thereof, said conduit being defined by longitudinal wall members, one of said longitudinal wall members being movable with respect to the other of said wall members and with respect to the outlet, a movable closure member movable within said conduit and movable between the inlet and outlet ends thereof, said closure member having a door held closed during movement of said closure member, means for moving said closure member towards said outlet to force material through said conduit into said receptacle, and means for moving said movable wall member to retain said material in said receptacle when said closure member is returned to its initial position.

10. A material handling device comprising a receptacle, means forming a transversely expansible conduit having defining walls one of which is movable relative to the others, said conduit having an outlet adjacent one end thereof in communication with the interior of said receptacle and having an inlet adjacent the opposite end thereof, said conduit being normally of smaller cross-sectional area adjacent the outlet than adjacent the inlet, movable packing means disposed within said conduit and movable between the inlet and outlet ends means co-operable with the packing means and the movable wall to move such wall to thereby expand the area of the conduit adjacent the outlet as the packing means moves toward the outlet and to contract the area of the conduit adjacent the outlet as the packing means returns toward the inlet, and means providing an inlet for depositing material within the conduit in front of said packing means.

11. A material handling device comprising a receptacle, means forming a transversely expansible conduit having defining walls one of which is movable relative to the others, said conduit having an outlet adjacent one end thereof in communication with the interior of said receptacle and having an inlet adjacent the opposite end thereof, said conduit being normally of smaller cross-sectional area adjacent the outlet than adjacent the inlet, a packing ram disposed within said conduit and movable between the inlet and outlet ends, means co-operable with the ram and the movable wall to move such wall to thereby expand the area of the conduit adjacent the outlet as said ram moves toward the outlet and to contract the area of the conduit adjacent the outlet as said ram returns toward the inlet, and means providing an inlet for depositing material within the conduit in front of said ram.

12. A material handling device comprising a receptacle, means forming a transversely expansible conduit having defining walls one of which is movable relative to the others, said conduit having an outlet adjacent one end thereof in communication with the interior of said receptacle and having an inlet adjacent the opposite end thereof, said conduit being normally of smaller cross-sectional area adjacent the outlet than adjacent the inlet, a movable packing ram of fixed cross-sectional area disposed within said conduit and movable between the inlet and outlet ends, means co-operable with the ram and the movable wall to thereby expand the area of the conduit adjacent the outlet as said ram moves toward the outlet and to contract the area of the conduit adjacent the outer as said ram returns toward the inlet, and means providing an inlet for depositing material within the conduit in front of said ram.

13. A material handling device comprising a receptacle, sheet metal wall members forming a transversely expansible conduit, one of said wall members being movable relative to the others, said conduit having an outlet adjacent one end thereof in communication with the interior of said receptacle and having an inlet adjacent the opposite end thereof, said conduit being normally of smaller cross-sectional area adjacent the outlet than adjacent the inlet, movable packing means disposed within said conduit and movable between the inlet and outlet ends, means co-operable with the packing means and the movable wall member to thereby expand the area of the conduit adjacent the outlet as said packing means moves toward the outlet and to contract the area of the conduit adjacent the outlet as said packing means returns toward the inlet, and means providing an inlet for depositing material within the conduit in front of said packing means.

14. A material handling device comprising a receptacle, sheet metal wall members forming a transversely expansible conduit, one of said wall members being movable relative to the others, said conduit having an outlet adjacent one end thereof in communication with the interior of said receptacle, and having an inlet adjacent the opposite end thereof, said conduit being normally of smaller cross-sectional area adjacent the outlet than adjacent the inlet, a packing ram of fixed cross-sectional area disposed within said conduit and engaging the walls thereof, said packing ram being movable between the inlet and outlet ends to force material through the conduit, means co-operable with the ram and the movable wall member to thereby expand the area of the conduit adjacent the outlet as said ram moves toward the outlet and to contract the area of the conduit adjacent the outlet as the ram returns toward the inlet, and means providing an inlet for depositing material within the conduit in front of said ram.

15. A material handling device comprising a receptacle, an elongated conduit communicating with the interior of said receptacle, longitudinally extending wall members forming said conduit, certain of said wall members being movable with respect to the opposite side of said conduit to thereby vary the transverse, cross-sectional area of said conduit, a movable member disposed within said conduit engageable with the inside surfaces of said wall members and movable between the inlet and outlet of said conduit, means for moving said member between said outlet and inlet while in engagement with the inside surfaces of said wall members, means co-operable with said certain of said wall members and said movable member to thereby vary the transverse, cross-sectional area of said conduit as said member is moved therealong, and means providing an inlet for depositing material within the conduit in front of the movable member.

16. A material handling device comprising a receptacle, wall members one of which is movable relative to the others defining a transversely expansible conduit communicating with the interior of said receptacle, an inlet formed in one end of said conduit and an outlet formed in the opposite end thereof, said conduit normally varying in transverse, cross-sectional areas between the inlet and outlet, a movable member of fixed cross-sectional area disposed within the said conduit transversely thereof and engageable with the inside surface of said conduit and movable between the inlet and outlet thereof, means for moving said member between said outlet and inlet while in engagement with said inside surface means co-operable with the movable member and the movable wall member to thereby vary the transverse, cross-sectional area of said conduit as said movable member is moved therealong, and means providing an inlet for depositing material within the conduit in front of the movable member.

17. A material handling device comprising a receptacle, an inlet conduit having an outlet formed in one end thereof in communication with the interior of said receptacle, an inlet formed in said conduit in the opposite end thereof, said conduit being defined by longitudinal wall members, one of the longitudinal wall members being inwardly curved adjacent the outlet end thereof, means movably mounting said one of the walls for movement with respect to said outlet and with respect to the other wall members, a movable closure member disposed within said conduit and movable within the conduit between the inlet and outlet ends thereof, means for moving said closure member toward said outlet to force said material through said conduit, means co-operable with the closure member for moving said movable wall member to retain said material in said receptacle when said closure member is returned to its initial position, and means providing an inlet for depositing material within the conduit in front of the movable member.

EDWARD R. BARRETT.

CERTIFICATE OF CORRECTION.

Patent No. 2,323,366. July 6, 1943.

EDWARD R. BARRETT.

It is hereby certified that error appears in the printed specification of the above numbered patent requiring correction as follows: Page 4, second column, line 14, claim 12, for "outer" read --outlet--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.